United States Patent [19]

Cidon et al.

[11] Patent Number: 5,016,247
[45] Date of Patent: May 14, 1991

[54] MULTIHOP TIME ASSIGNED SPEECH INTERPOLATION (TASI) SYSTEM FOR TELECOMMUNICATION NETWORKS

[75] Inventors: Israel Cidon, New York, N.Y.; Inder S. Gopal, Fort Lee, N.J.

[73] Assignee: IBM Corporation, Armonk, N.Y.

[21] Appl. No.: 390,122

[22] Filed: Aug. 7, 1989

[51] Int. Cl.$^5$ .............................................. H04J 3/17
[52] U.S. Cl. ................................. 370/81.00; 370/63;
370/105; 370/95.1; 370/80
[58] Field of Search .................... 370/81, 63, 80, 105, 370/95, 44.1

[56] References Cited

U.S. PATENT DOCUMENTS

| | | | |
|---|---|---|---|
| 2,935,569 | 3/1964 | Saal et al. | 370/81 |
| 3,644,680 | 2/1972 | Amano et al. | 370/81 |
| 3,956,593 | 5/1976 | Collins et al. | 370/63 |
| 4,100,377 | 7/1978 | Flanagan | 370/81 |
| 4,178,483 | 12/1979 | Lager et al. | 370/63 |
| 4,281,218 | 7/1981 | Chuang et al. | 370/81 |
| 4,352,957 | 10/1982 | Ruether | 370/81 |
| 4,797,589 | 1/1989 | Collins | 370/63 |

Primary Examiner—Douglas W. Olms
Assistant Examiner—Dang Ton
Attorney, Agent, or Firm—Ratner & Prestia

[57] ABSTRACT

A telecommunication system performs multihop TASI over every hop with a single instance of speech activity detection for each voice call. The system utilizes a Time-Space-Time circuit switch interposed between an input and an output trunk. The input time stage is configured to collect call samples from the input trunk and to map the physical slots associated with the samples to the switch slots of the conventional space switch portion of the circuit switch portion of the circuit switch. In-b signalling of the active state of a switch slot is provided by the input time stage to the output time stage via the space switch. The output time stage is configured to assign physical slots on the outgoing trunk to active switch slots and to discard inactive switch slots.

14 Claims, 4 Drawing Sheets

TDM FRAME STRUCTURE

MULTIHOP TIME ASSIGNED SPEECH INTERPOLATION (TASI) SYSTEM FOR TELECOMMUNICATION NETWORKS

BACKGROUND OF THE INVENTION

Voice communications, in general, do not utilize the speed of the links between source and destination because of periods of silence and also because there is usually speech activity only in one direction. TASI (Time Assigned Speech Interpolation) is a technique whereby the silences in speech are employed to increase the number of voice calls that a link can carry. The basic idea behind TASI is that whenever a silence period occurs in a particular voice call, the slot allocated to that voice call is freed and assigned, if necessary, to another voice call in talkspurt, that is, a call exhibiting voice activity. The basic costs in implementing TASI are the link signalling required to reassign the slots and the speech activity detection to determine the silence periods. In current TASI systems, the link signalling is done through a separate channel between transmitter and receiver. The TASI function is performed independently over each hop, and thus the speech activity detection for each voice call is also done separately for each hop. Consequently, the cost of TASI is prohibitive and it is implemented only over expensive trans-oceanic lines.

The extension of the TASI feature to a full network, that is, over the multiple switching nodes which are typically present between the conversing parties, is of significant value. However, in addition to the aforementioned difficulties in present TASI implementations, the circuit switches associated with each node must be reconfigured sufficiently fast whenever a new path is required. Since most conventional circuit switches are not fast enough and would result in voice clipping, a multihop TASI scheme which requires such rapid reconfiguration is of limited utility.

What is desired is a system that performs TASI over every hop with a single instance of speech activity detection for each voice call. That is, voice detection is accomplished at the source and each circuit switch signals the succeeding switch until the call reaches its destination. Moreover, the signalling over each link should be accomplished in-band, that is, it should not require a separate physical channel. Finally, the system should use conventional circuit switches and should not require that these switches be reconfigured every time a new call is originated. The system of the present invention exemplifies these features.

SUMMARY OF THE INVENTION

A basic building block in a TASI system is the link signalling mechanism required for the reassignment of a Time Division Multiplex (TDM) slot from one voice call to another. The multihop TASI system of the present invention is implemented by using a variant of the simplest mechanism described in IBM Technical Disclosure Bulletin, Vol. 29, No. 12, May 1987, entitled "Dynamic Slot Assignment in TDM Frames". Briefly, the mechanism involves transmissions over a link which occur in the form of TDM frames. Each frame is divided into several slots, each of several bits, typically 1 byte, in duration. The slots are assigned addresses according to their position in the frame. Voice is transmitted over the frame in the form of circuits, that is, each connection identified by a unique logical call number has a fixed slot assigned to it in each frame. A link connects a transmitter and receiver.

The first transmitter, assuming that it is the source of the voice call, implements speech activity detection for the call. Whenever a silence period occurs, it assigns the slot used by the voice call to inactive status using the aforementioned dynamic slot assignment technique. The receiver realizes that the call is not in talkspurt and indicates to the transmitter that it is free to assign the slot on the outbound link to inactive status or to another voice call.

When the voice call moves back into talkspurt, the source assigns a slot back to this call and informs the receiver of this action. The receiver, realizing that the call is back in talkspurt, informs the transmitter on the outbound link to assign a slot to the voice call. This is done whenever a slot becomes available.

The foregoing operation assumes the presence of an initial call setup procedure involving a table which defines, for every logical connection number, the corresponding physical outgoing line. If the logical connection numbers are local to a node, then the table includes the logical connection number for the next hop. Logical connection numbers can also be specific to a physical link.

The mechanism for dynamic TDM slot allocation enables the intermediate nodes to allocate a slot on the incoming and outgoing links when a logical connection becomes active. In such a mechanism, the node must also provide a path through the circuit switches from incoming to outgoing slot. Typical circuit switches are of the Time-Space-Time (TST) variety.

The present invention provides circuit modifications of the respective input and output time stage portions of the present day TST switch, thereby enabling the TASI scheme to be implemented without the need for rapid switch reconfigurations when new paths are required. Thus, the input modified time stage (IMTS) of the present invention recognizes the control signal of a logical connection when the latter becomes active, and rearranges its output to ensure that it is mapping the right physical slots to the right switch slots of the space switch portion of the TST. The IMTS also informs the output modified time stage (OMTS) that a specific switch slot has now become active. This is accomplished by in-band signalling through the space switch. The OMTS reads samples from the space switch and if the sample is from an active slot, it is transmitted over its appropriate physical slot on the outgoing link.

A basic concept of the present invention is to reserve paths through the space portion of the circuit switch for all possible logical connections that pass through the switch. In order to guarantee this, the switch must have the capability to handle links of twice the capacity of the links actually in use. A factor of two is considered a reasonable estimate of the maximum TASI advantage. This may be accomplished by running the switch at twice the speed of the links or by doubling the size of the switch. The present implementation assumes that the switch has twice the speed of the links.

Other features and advantages of the present invention will become apparent in the detailed description which follows.

DESCRIPTION OF THE PREFERRED EMBODIMENT

Before describing the modifications to the input and output stages of the Time-Space-Time (TST) switch which enable the practice of the present TASI system, it is considered helpful to briefly examine the dynamic Time Division Multiplex (TDM) slot assignment mechanism used in the system. Transmissions over a link occur in the form of TDM frames, the frame structure being shown in FIG. 1. Each frame 10 is divided into several physical slots 12, each of several bits or typically one byte, in duration. The information slots 12 are assigned addresses according to their position in the frame. Voice is transmitted over the frame in the form of circuits. Each connection identified by a unique logical call or connection number (LN) has a fixed slot assigned to it in each frame. The transmitter and receiver are connected by a link. The transmitter is assumed to know the assignment of slots and the objective of the slot assignment mechanism is to enable the transmitter to inform the receiver of the assignment, thereby ensuring that the two end points of a link are in synchronization. In particular, the receiver must know which physical slots are occupied and the mapping from the physical slots to the logical connection numbers.

Figure 1:
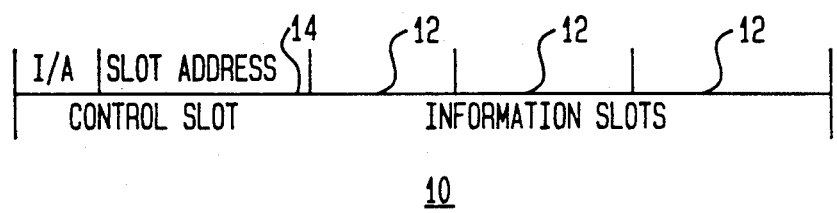
FIG. 1 illustrates the TDM frame structure of the slot assignment mechanism.

With continued reference to FIG. 1, there is reserved in each TDM frame 10, one slot 14 for link control. This slot is used in the following way. Each slot 12 in the frame 10 is assigned an address. Whenever a slot changes its type from active to inactive, inactive to active or from one active voice call to another, the address of the slot 12 is placed in the control slot 14, together with an extra bit (the I/A bit) indicating if the slot is now respectively inactive or active.

Figure 2:
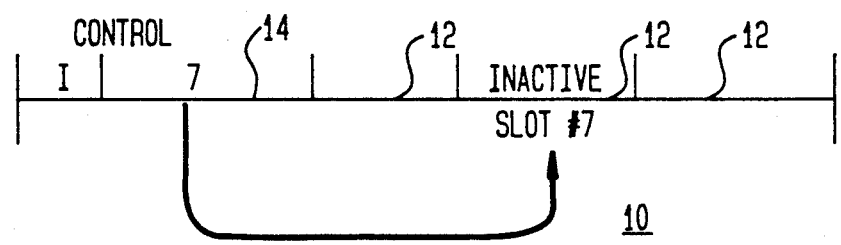
FIG. 2 depicts the assignment of a slot in the frame structure of FIG. 1 to inactive status.

FIG. 2, illustrates the use of the frame structure of FIG. 1 to assign a slot to inactive status. For example, slot #7 has become inactive and its address has been placed in the control slot along with the prefix bit "I".

Figure 3:
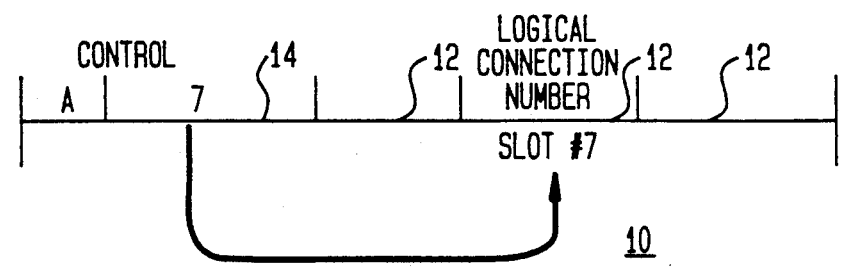
FIG. 3 depicts the assignment of a slot in the frame structure to active status.

If the slot is being assigned to a new voice call, that is, if it is going from inactive to active or from one active call to another, the logical connection number (LCN) of the voice call is placed in the slot that is being changed. The use of the frame structure to assign #7 slot to voice is shown in FIG. 3. The prefix bit is changed to "A".

As indicated in simplified fashion in FIG. 4, and using the dymanic TDM slot assignment mechanism described in connection with FIGS. 1-3, multi-hop TASI may be implemented in the following fashion. The first transmitter 16 which is assumed to be the source of the voice call implements speech activity detection in unit 18 for the call. Whenever a silence period occurs, it assigns the slot used by the voice call to inactive status using the dynamic slot assignment technique. The receiver 20 realizes that the call is not in talkspurt, and indicates to the transmitter on the outbound link that it is free to assign the slot on the latter link to inactive status or to another voice call. The actual assignment then occurs in the manner described in connection with FIGS. 1-3.

When the voice call moves back into talkspurt, the source assigns a slot to this call, and informs the receiver of this. The receiver realizes the call is back in talkspurt and informs the transmitter on the outbound link to assign a slot to the voice call. This is done whenever a slot becomes available.

Figure 4:
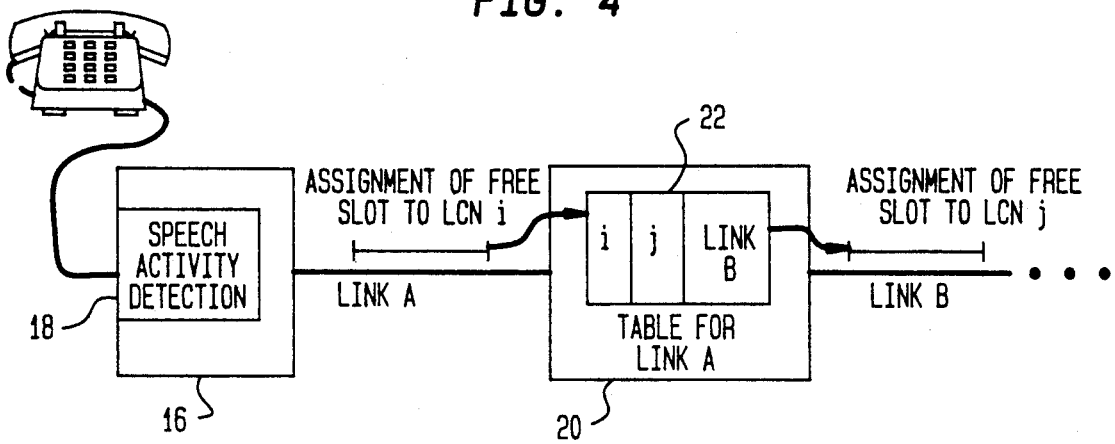
FIG. 4 illustrates in simplified form a multihop TASI system.

The previous operation assumes that some initial call setup procedure has constructed a table 22 as indicated in FIG. 4, that defines, for every active logical connection number (LN), the corresponding physical outgoing line. If the logical connection numbers are local to a node then this table must also incude the logical connection number for the next hop. Logical connection numbers can also be specific to a physical link.

The mechanisms for dynamic TDM slot allocation enable the intermediate nodes to allocate a slot on the incoming and outgoing inks when a logical connection becomes active. However, for the mechanism described above, the node must also provide a path through the switching fabric from incoming to outgoing slot. Typical circuit switching fabrics are of the Time-Space-Time (TST) variety and therefore all three stages must be reconfigured when a new path is required. If the switch fabric can be reconfigured sufficiently fast, then the problem is easily solved. However, most conventional circuit switches are not fast enough and hence a multihop TASI scheme which requires such rapid reconfiguration is of a limited value. Therefore the present invention provides modifications to the time stages of a TST switch which will enable the TASI scheme to be implemented without the need for rapid switch reconfigurations.

The basic idea of the invention is to reserve through the space switch, paths for all possible logical connections that pass through the switch. In order to guarantee this, the switch must have the capability to handle links of approximately twice the capacity of the links actually in use. This is accomplished by running the switch at twice the speed of the links or by increasing the size of the switch by two. The implementation described herein assumes that the switch has twice the speed of the links.

Figure 5:
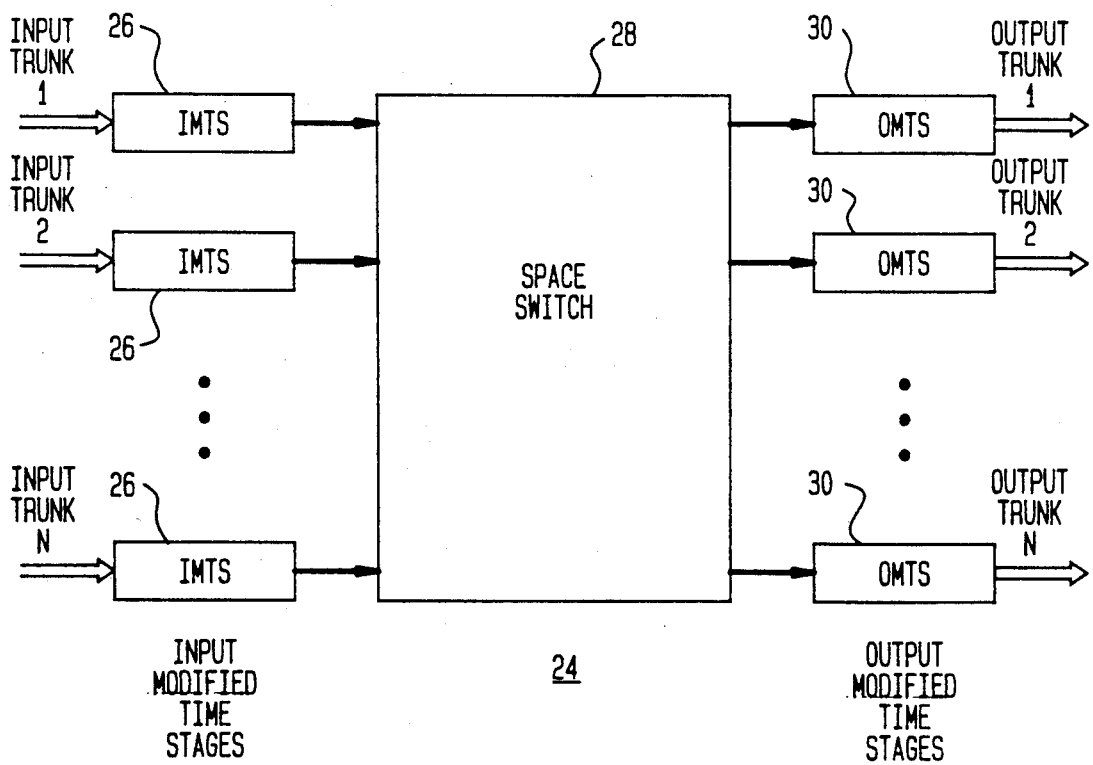
FIG. 5 depicts a Time-Space-Time switch having an input modified time stage (IMTS) and an output modified time stage (OMTS), in accordance with the present invention.

FIG. 5 is a block diagram depicting a conventional TST switch 24, modified in the input and output time stages in accordance with the present invention. The switch consists of three basic building units, an Input Modified Time Stage (IMTS) 26 to be described later, a conventional space switch 28 that is routinely used in the design of a telecommunication circuit switch, such as a simple crossbar switch, and an Output Modified Time Stage (OMTS) 30 that will be also described later. As an overview, the general principles of operation are as follows. When a logical connection on the input trunk becomes active the Input Modified Time Stage (IMTS) 26 recognizes the control signal, and rearranges its output to ensure that it is mapping the right physical slots (PS) in the trunk to the right switch slots (SS) in the space switch 28. The output of the IMTS operates at twice the speed of the input links. It must have, preloaded into it, the mapping from logical channel number (LN) to space switch slot (SS). In addition, it informs the OMTS that a specific switch slot has now become active. This is done by in-band signalling through the space switch by using the ninth bit following every byte to indicate the active or inactive status of the space switch slot.

The OMTS reads samples of calls from the space switch 28. If a sample is of an inactive call, that sample is discarded. If the sample is from an active switch slot, that sample should be transmitted over its appropriate slot on the output trunk, that is, the outgoing link. It should be recalled that the input to the OMTS 30 from the space switch 28 has twice the number of slots or samples than its output to the link. In some overload conditions, samples may be lost if more than half of the logical calls are active. However, under normal circumstances less than half of the input slots will be active and in this case all input data will be transmitted over the output link.

When a particular call makes a transition from inactive to active, the OMTS 30 senses this through observing a transition in the ninth status bit which follows the call byte information. It then knows that a particular voice call has requested a time slot on the outgoing link. If a slot is available, it assigns it to the slot and accordingly updates its rearrangement of switch slots to slots on the outgoing link. If a slot is not available, it does not assign any slot on the outgoing link and will try again the next time a sample from that call arrives in the next frame. When a call makes a transition from active to inactive, the OMTS will free up a slot on the outgoing link and ensure that all subsequent samples from that call are discarded.

Figure 6:
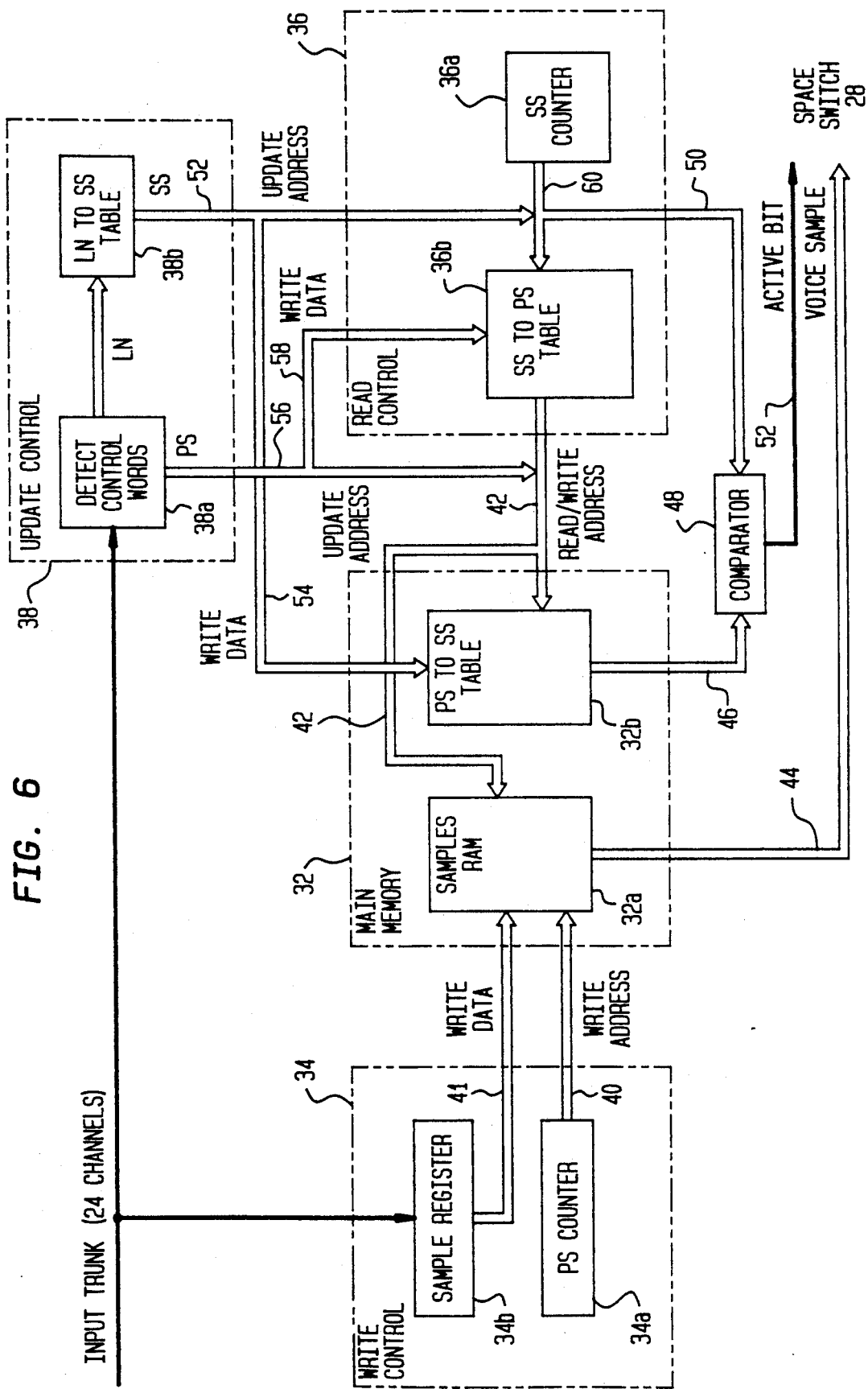
FIG. 6 is a detailed block diagram of the input modified time stage (IMTS).
Figure 7:
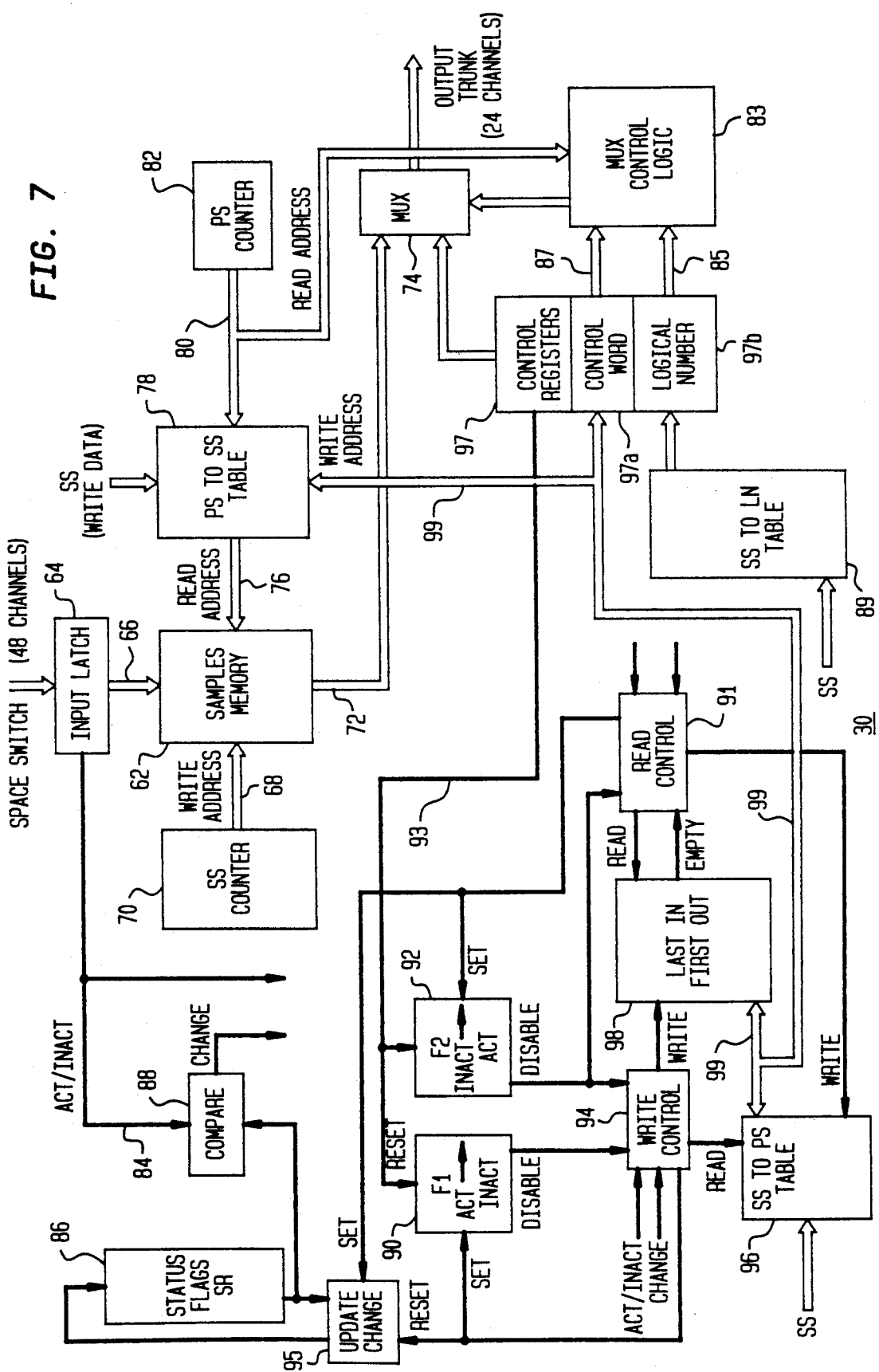
FIG. 7 is a detailed block diagram of the output modified time stage (OMTS).

With regard to FIGS. 6 and 7, the design of the input and output time stages, IMTS 26 and OMTS 30 respectively, needed to accomplish the slot management protocol above will be described. FIG. 6 is a detailed organizational diagram of the IMTS which is coupled to the input port of the space switch 28 and to the input trunk, as seen in FIG. 5. It is assumed that the switch is operating at twice the speed of the trunk which enables a path for any logical call from the input IMTS 26 to its destination OMTS 30. For example, if the trunk is a T1 link then up to 48 logical calls may exist and all of them have a distinct path in the space switch fabric. For each logical call of a particular IMTS or OMTS, a unique logical number LN and a unique time slot SS are associated in which this logical call is switched through the space switch fabric. FIG. 7 is a detailed diagram of the OMTS which is interposed between the output port of switch 28 and the output trunk.

Referring to FIG. 6, the IMTS 26 is responsible for collecting the samples from the input trunk, and sending them through the space switch 28 at the appropriate switch slots. It is also responsible for the decoding of the control signals associated with logical channel becoming active or inactive. It signals the OMTS circuit 30 at the output port of the switch 28 about these changes.

The circuit is divided into four major sections: the main memory section 32, the write control section 34, the read control section 36 and the update control section 38. The main memory is divided into two parts, namely the samples part 32a and the PS to SS part 32b. Each of the last mentioned parts is realized through standard Random Access Memory. For both parts, the number of words is the number of physical slots (PS) in the trunk's frame. For each PS, the samples part 32a contains the data voice sample most recently received over the input trunk in the corresponding time slot. The PS to SS part 32b contains for each PS, the slot number SS which corresponds to the logical call which is now using the physical slot. In normal operation when no update is needed, the IMTS works as follows. The main memory time is divided into three cycles, one write cycle, followed by two read cycles. In the write cycle, the samples part 32a of the main memory 32 is addressed via line 40 by the PS counter 34a in the write control section 34, which stores each input sample byte from register 34b, received via line 41 in its associated location in the samples RAM 32a. In the read cycle, both the samples part 32a and the PS to the SS part 32b of the main memory are addressed via line 42 by the address generated by the read control section 36. Essentially, as will be described hereinafter, the read control section 36 generates the PS for the current SS and thus the sample that corresponds to the voice call assigned to the current SS is read out on line 44 to the space switch stage 28 (FIG. 5).

The read control section 36 contains an SS counter 36a which operates at the space switch speed. This is implemented using a standard binary counter chip. The SS number is translated to a PS number using a look up RAM table 36b. This is implemented using a standard RAM chip. Here the translation reflects which PS is used by each SS. The PS number obtained from this table 36b addresses the main memory 32 via line 42, accessing both the sample in 32a and the SS number in 32b. The reason the SS number is accessed is the following. Since there are more SS (switch slots) than PS (physical slots), it is possible that the same PS appears more than once in this table. Thus, the same sample could be read out more than once onto the space switch. In order to eliminate this possibility, the SS number from table 32b of the main memory 32 appearing on line 46 is compared in comparator 48 to the SS number of the SS counter 36a on line 50. If they are equal, the sample is sent over the switch and the active bit on line 52 is set to one. Otherwise, the active bit is set to zero, indicating to the OMTS that the sample is to be discarded. Since the main memory 32 contains a single SS number for each PS number, a sample from a given PS will be sent only once over the switch with an active bit set. It is assumed that the active bit on line 52 is sent over the space switch fabric to the destination port as an extra bit of the sample.

The update section 38 comprises a detect control words section 38a and a LN to SS RAM table 38b. The detect control words section 38a is responsible for detecting when a control request appears in the input trunk and for obtaining the relevant parameters for this request. In an operative system, it is implemented through a combination of latches and simple logic. The request may be for activating a logical call in a specific PS, or inactivating some logical call. In the former case, the PS number is implied by the control word and the LN is part of the data in the PS slot addressed by the control word. In the latter case, only a PS number is needed and is implied by the control word, Both numbers are latched in the detect control words circuit 38a of the update control section 38. Following the reception of both LN and PS by this section, the LN is translated to a SS number using a look-up RAM 38b. The update control section 38 uses one of the write cycles of the main memory 32 in which both the read control section 36 and the PS to SS part 32b of the main memory 32 are inactive. If the call is activated, the SS number on line 52 is written to the PS to SS part 32b of the main memory 32 via line 42 addressed by the PS number of the control word line 56. At the same time, the PS number is written to the SS to PS table 36b in the read control section 36 via line 58 using the corresponding SS from counter 36a via line 60 as an address to this table. If the call was inactivated, only the PS to SS part 32b of the main memory 32 is accessed. Some dummy SS number which is different from all possible existing SS numbers, is stored in the corresponding PS address. This insures that no match will occur for this particular PS in the compare circuit 48.

A number of advantages are inherent in the IMTS of FIG. 6. One is that the IMTS is capable of high speed which enables operation in real time, thereby causing the activation and inactivation of calls to be accomplished within a single TDM frame. This property while not essential for voice, is necessary for data, and thus the circuit can handle boundary management in voice/data integration. Another significant advantage of the IMTS design is that whenever a new call is activated in a specific PS, there is no need for searching for the old call that used this PS before and then, inactivating it. The activation of a new call automatically inactivates the old one. A further advantage is that it is necessary to update only one table from a higher level controller, namely, the LN to SS table 38b in the update control section 38. The SS to PS table 36b in the read control section 36 does not need even to be initialized to specific initial values. Only the PS to SS part 32b of the main memory 32 should be initialized to all dummy SS numbers.

FIG. 7 depicts the Output Modified Time Switch (OMTS) 30. The OMTS collects the voice samples of all logical calls destined for the output trunk, that is, the outgoing link. For the active calls, it chooses an empty physical slot (PS), if any are available, and sends the sample from that call over the output trunk. In addition, whenever the OMTS changes the allocation of a PS to a different call or to an inactive state, it sends the IMTS at the other end of the outgoing link a control signal in accordance with the slot assignment protocol described previously.

An actual operative OMTS circuit is composed of standard off-the-shelf components that include registers, counters, latches, comparators, flip-flops, multiplexors and RAM's. Incoming samples received by way of the space switch 28 are stored and read out from the samples memory 62. The sample memory time is divided into three cycles: two write cycles, followed by one read cycle. In normal operation when no change is needed, for each switching slot (SS) the sample is latched at the input latch 64 and is written via line 66 to the sample memory 62 according to the write address on line 68 of the SS counter 70. In the reading period, the samples are read out via line 72 through the multiplexor (MUX) 74 onto the output trunk. The read address on line 76 is provided by the PS to SS translation table 78, which in turn is addressed on line 80 by the PS counter 82.

Whenever a new sample is latched at the input latch 64, the active bit on line 84 is compared to the status flag which is stored in a rotating Shift Register 86. The shift register operates at the speed of the space switch 28, namely, the SS rate. The comparison is done through comparator 88. If the bits are equal, no extra action is taken. Otherwise, it is known that a change of state has occurred in the logical call that occupies that SS. It is necessary to distinguish between a logical call becoming inactive or becoming active. In the former case when a call becomes inactive, if no other call in this frame has changed state according to the flip-flops F1 (90) and F2 (92), the following actions are taken. Under the control of the write control circuit 94, the PS, which corresponds to the SS which has changed state, is read from the SS to the PS translation table 96 into a last in-first out (LIFO) memory 98 through a common bus 99. The common bus 99 is used for the write address to the PS to SS table 78, read/write data to the SS to PS table 96, read/write data to the LIFO 98 and write data to the control word portion 97a of the registers 97. When the PS is read into the LIFO 98, this releases it for the use of other calls. At the same time Flip-Flop F1 (90), is set and the Status Flag in the SR 86 is set to "zero" through reset of the Update/change flip-flop 95. Also, the control word section 97a is updated with a new control word which contains the PS number just read. No change in the contents of the PS to SS table 78 is needed.

After this is done the LIFO 98 contains a new PS number which is free to be used by other logical calls. The status flag in the status flag SR 86 of the corresponding SS, is set to "zero". F1 (90) is set, thereby blocking any other changes from active to inactive in the next frame, and a new control word is ready for transmission. This word will be sent at the first PS of the next frame. When this transmission occurs F1 (90) and F2 (92) are reset again through line 93 and a new change from active to inactive may take place.

Whenever a logical call changes from inactive to active, this condition is detected by comparing the status flag in SR 86 with its active bit through comparator 88. If no other change from inactive to active was made in the same frame (it should be noted that a change from active to inactive may occur) as indicated by the flip-flop F2 (92) and if the LIFO memory 98 is not empty, then the following actions are taken by the read control circuit 91: (a) the LIFO memory 98 is read onto the bus 99 and is used as the write address for the PS to SS table 78 and as write data for the SS to PS table 96. Since a LIFO memory is being used, this ensures that if in the same frame, some other SS became inactive, the newly active SS will use the same PS number. Thus, the two changes, activation and inactivation may be combined into a single frame, since the activation of a new call in a particular PS implies the inactivation of the old call which used the same PS before. (b) Flip-flop F2 (92) is then set, the corresponding status flag in the SR 86 is set to "one". (c) A new control word via bus 99 into the word portion 97a, and a logical channel number, from the SS to LN table 89 are written to the logical number portion 97b on the control registers 97. The new control word may overwrite one that was written before, for a call inactivation.

The control word and LN appearing on lines 87, 85 are sent on the output link via multiplexor (MUX 74) under the control of the MUX logic unit 83 in the appropriate PS. The control word is sent in PS number 1, and the LN in the slot whose number is contained as a part of the control word. When the control word is sent, F1 (90) and F2 (92) are set back to "zero".

Prior to operation of the system, the SS to LN table 89 must be updated by a higher level processor as part of the call set up. The LIFO memory 98 should be initialized to contain all PS numbers. The control registers 97 and the shift register 86 needs to be set to "zero". No other memories require initialization.

The design of the input and output stages of the circuit switch taught herein provides an efficient, cost effective multihop TASI system. Changes and modification may be required to suit particular requirements. Such changes which are within the skill of the circuit designer and which do not depart from the true spirit and scope of the invention are intended to be covered by the claims which follow.

The invention claimed is:

1. In a telecommunication network for implementing multihop Time Assigned Speech Interpolation (TASI) having at least an input trunk and an output trunk for carrying transmissions in the form of frames, each frame having a plurality of physical slots associated respectively with logical channel numbers of respective calls being transmitted, and a circuit switch of the Time-Space-Time variety interposed between the input trunk and output trunk and wherein the space switch portion of said circuit switch has at least an input port and an output port and includes a plurality of switch slots, the improvements in said circuit switch comprising:

an input modified time state (IMTS) having an input terminal and an output terminal, means coupling the input and the output terminals of said IMTS respectively to said input trunk and to said input port of the space switch, said IMTS including means for collecting samples of inactive/active calls in said frame of said input trunk and for mapping the physical slots associated with the call samples to predetermined ones of the switch slots in said space switch, an output modified time stage (OMTS) having an input terminal and an output terminal, means coupling the input and the output terminals of said OMTS respectively to said output port of said space switch and to said output trunk, said IMTS providing a signal via said space switch to said OMTS indicative of a change in status of selected ones of said predetermined space switch slots, said OMTS including means responsive to the signals from said IMTS for indicating a change in the assignment of a physical slot in a frame of said output trunk for each call sample of the selected space switch slots indicated as having a change in status.

2. A telecommunication network as defined in claim 1 wherein said means included in said IMTS for collecting call samples and for mapping said samples through said space switch comprises memory means coupled to said input trunk and having a first section for storing the call sample most recently received over said input trunk in the corresponding time slot and a second section for storing the switch slot number corresponding to the logical call which is currently disposed in each of the physical slots in the frame.

3. A telecommunication network as defined in claim 2 further including in said IMTS a read control section, said read control section comprising a switch slot-to-physical slot look-up table and a switch slot counter, said counter addressing said table to provide the physical slot number for the current switch slot, said last mentioned number being applied as an address to said memory means, whereby the call sample assigned to the current switch slot is read out to the input port of said space switch.

4. A telecommunication network as defined in claim 3 further including a write control section for coupling said memory means to said input trunk, said write control section having a sample register interposed between said input trunk and said first section of said memory means and a physical slot counter for addressing said last mentioned section in writing each call sample in its associated location in said section.

5. A telecommunication network as defined in claim 4 further including in said IMTS an update control section comprised of a detect control words section coupled to said input trunk and a logical call number-to-switch slot table, said detect control words section detecting when a control request for activating a new logical call or inactivating a logical call appears in said input trunk and for obtaining the logical call number and physical slot relevant to the request, said logical call number-to-switch slot table being addressed by logical call numbers in said detect control words section, said update control section writing, in response to the detection of the activation of a call, the slot number from said last mentioned table to said second section of said memory means and concurrently to the switch slot-to-physical slot table of said read control section, said update control section writing, in response to the inactivation of a call, solely to said second section of said memory means.

6. A telecommunication network as defined in claim 5 wherein said means in said OMTS responsive to the signals from said IMTS include a samples memory coupled to said output port of said space switch for storing call samples, means for reading the samples out of said samples memory, and multiplexor means interposed between said samples memory and said output trunk for placing said samples on said trunk.

7. A telecommunication network as defined in claim 6 wherein said samples memory is coupled to said space switch by an input latch, means coupled to said input latch for comparing a status bit associated with the call sample to a status flag stored in a shift register, the identity of the respective status bit and flag being indicative of no change in the state of the call sample that occupies the switch slot.

8. A telecommunication network as defined in claim 7 characterized in that the dissimilarity of said status bit and status flag is indicative of a change in state having occured in said call sample, a last in–first out memory, means responsive to a change from active to inactive state of said call sample for storing in said last mentioned memory the physical slot number of the switch slot which has changed state, thereby providing a new physical slot number which is free to be used by other logical calls, and means for transmitting in a predetermined slot of the next frame on said output trunk, control data indicative of said change-of state of said switch slot.

9. A telecommunication network as defined in claim 8 further including first bistable means coupled to said status flag shift register for changing the status flag corresponding to the change in state of a switch slot and second bistable means responsive to the change of a switch slot from active to inactive state for inhibiting the storing of data in said last in–first out memory should any other changes from active to inactive occur in the next frame.

10. A telecommunication network a defined in claim 8 including means responsive to a change from inactive to active state of said call sample for reading out the last in–first out memory, a switch slot-to-physical slot table and a physical slot-to-switch slot table, means coupling the output of said last mentioned memory as a write address to the former table and as write data to the latter table, thereby permitting the newly active switch slot to use the same physical slot number as that formerly used by a switch slot number which attained an inactive state in the same frame, and means for transmitting in respective predetermined slots of the next frame on said output trunk, control data and logical call number indicative of the change of state of said switch slot.

11. A telecommunication network as defined in claim 10 further characterized in that said means for transmitting said control data and logical call number includes control registers operatively coupled to receive said last mentioned data and call number, and a multiplexor interposed between said control registers and said output trunk.

12. In a telecommunications network including first and second Time Assigned Speech Interpolation (TASI) data paths which each convey a plurality of logical messages as a plurality of frames, each frame containing a plurality of data samples derived from respectively different ones of said logical messages, said first and second TASI data paths being linked by switching means having a plurality of input ports and a plurality of output ports and including a space switch, apparatus comprising:

means for assigning a path through said space switch for each logical message which may be conveyed by said first TASI data path, means for translating a change in status of a selected logical message conveyed by said first TASI data path into a status indication signal for transmission over the path through the space switch assigned to said selected logical message, and means for changing the logical message samples conveyed by a frame of said second TASI data path in response to the status indication signal provided by the space switch.

13. The apparatus set forth in claim 12 wherein said first TASI data path is coupled to a plurality of logical message sources, each message source providing a sequence of samples representing a respective message, said apparatus further including:

identifying means coupled to said plurality of message sources for identifying samples representing inactive intervals in said each of said respective logical messages, assigning means coupled to said identifying means for assigning samples of selected ones of said logical messages to an input frame and for indicating a change the selected logical messages conveyed by said input frame in response to a sample representing an inactive interval in one of the selected logical messages, and means for applying the frames generated by said assigning means to said first TASI data path.

14. The apparatus set forth in claim 13 in which said means for changing the logical message samples conveyed by said second TASI data path includes:

output assigning means coupled to said switch means for assigning samples provided by a selected output port of said switch means and representing selected ones of said logical messages to an output frame and for indicating a change in the selected logical messages assigned to said output frame in response to one of the status indication signals provided by said switch means.

* * * * *